(12) United States Patent
Breniman et al.

(10) Patent No.: US 9,001,200 B2
(45) Date of Patent: Apr. 7, 2015

(54) CELL CHARACTERIZATION USING MULTIPLE FOCUS PLANES

(75) Inventors: Gene Breniman, Hercules, CA (US); Michael Griffin, Hercules, CA (US)

(73) Assignee: Bio-Rad Laboratories, Inc., Hercules, CA (US)

(*) Notice: Subject to any disclaimer, the term of this patent is extended or adjusted under 35 U.S.C. 154(b) by 1017 days.

(21) Appl. No.: 13/004,718

(22) Filed: Jan. 11, 2011

(65) Prior Publication Data

US 2012/0013727 A1    Jan. 19, 2012

Related U.S. Application Data

(60) Provisional application No. 61/294,416, filed on Jan. 12, 2010.

(51) Int. Cl.
| | |
|---|---|
| H04N 7/18 | (2006.01) |
| G06K 9/00 | (2006.01) |
| G02B 7/36 | (2006.01) |
| G06T 5/00 | (2006.01) |
| G06T 5/50 | (2006.01) |
| G06T 7/00 | (2006.01) |

(52) U.S. Cl.
CPC .............. *G06K 9/00134* (2013.01); *G02B 7/36* (2013.01); *G06T 5/003* (2013.01); *G06T 5/50* (2013.01); *G06T 7/0012* (2013.01); *G06K 9/00147* (2013.01); *G06T 2207/20076* (2013.01); *G06T 2207/20221* (2013.01); *G06T 2207/30024* (2013.01)

(58) Field of Classification Search
CPC .......... G06K 9/00134; G06K 9/00147; G06K 2207/20076; A61B 1/005
USPC ......................................................... 348/79
IPC ......................................................... H04N 7/18
See application file for complete search history.

(56) References Cited

U.S. PATENT DOCUMENTS

| | | | |
|---|---|---|---|
| 4,097,845 A | 6/1978 | Bacus | |
| 6,026,174 A | 2/2000 | Palcic et al. | |
| 6,137,899 A | 10/2000 | Lee et al. | |
| 7,215,467 B2 | 5/2007 | Nakagawa | |
| 7,469,056 B2 * | 12/2008 | Ramm et al. | 382/128 |

(Continued)

FOREIGN PATENT DOCUMENTS

| | | |
|---|---|---|
| JP | 64-029765 | 1/1989 |
| JP | 2001-512824 | 8/2001 |

(Continued)

OTHER PUBLICATIONS

International Search Report and Written Opinion of PCT/US11/20952 mailed on Mar. 9, 2011, 7 pages.

(Continued)

*Primary Examiner* — Tung Vo
(74) *Attorney, Agent, or Firm* — Kilpatrick Townsend & Stockton LLP (57) ABSTRACT

A system for characterizing cells takes a series of digital images of a sample containing the cells. Each of the images is taken at a different plane of focus. One of the images is determined to have been taken at a plane of best focus. The system analyzes the digital image taken at the plane of best focus and at least one other of the digital images to classify cells in the sample as either live or dead.

16 Claims, 5 Drawing Sheets

(56) References Cited

U.S. PATENT DOCUMENTS

| | | | |
|---|---|---|---|
| 7,764,822 B2 * | 7/2010 | Ramm et al. | 382/133 |
| 7,817,840 B2 | 10/2010 | Mattheakis et al. | |
| 7,958,063 B2 | 6/2011 | Long et al. | |
| 8,488,863 B2 | 7/2013 | Boucheron | |
| 2003/0052991 A1 | 3/2003 | Stavely et al. | |
| 2004/0101912 A1 | 5/2004 | Rubin et al. | |
| 2005/0207633 A1 | 9/2005 | Arini et al. | |
| 2007/0031818 A1 | 2/2007 | Kutsyy et al. | |
| 2007/0268485 A1 | 11/2007 | Polonskiy et al. | |
| 2008/0279441 A1 | 11/2008 | Matsuo et al. | |
| 2010/0246927 A1 * | 9/2010 | Arbuckle | 382/133 |
| 2010/0328766 A1 | 12/2010 | Griffin et al. | |
| 2011/0211058 A1 | 9/2011 | McCollum et al. | |
| 2012/0015392 A1 | 1/2012 | Guo | |
| 2012/0295300 A1 | 11/2012 | Heng et al. | |
| 2012/0314092 A1 | 12/2012 | Chu et al. | |

FOREIGN PATENT DOCUMENTS

| | | |
|---|---|---|
| JP | 2002-258163 | 11/2002 |
| JP | 2004-532410 | 10/2004 |
| JP | 2005-529311 | 9/2005 |
| JP | 2006-517663 | 7/2006 |
| JP | 2007-509314 | 4/2007 |
| JP | 2007-20449 | 8/2008 |
| JP | 2008-116526 | 9/2008 |
| JP | 2009-530621 | 8/2009 |
| JP | 2010-276585 | 12/2010 |
| WO | 97/20198 A2 | 6/1997 |
| WO | 99/08091 | 2/1999 |
| WO | 01/35072 | 5/2001 |
| WO | 03/095986 A1 | 11/2003 |
| WO | 2004/072900 | 8/2004 |
| WO | 2006/055413 A2 | 5/2006 |
| WO | 2011/066837 A1 | 6/2011 |

OTHER PUBLICATIONS

Office action in related Canadian application No. 2,787,124, dated Nov. 7, 2013, 4 pages.

Office action in related Japanese application No. JP2012-548239, dated Feb. 14, 2014, 28 pages.

Supplementary European Search Report in related European application No. EP11733297, dated Apr. 8, 2014, 11 pages.

Gutierrez-Osuna, R. "Lecture 9: Introduction to Pattern Analysis", Intelligent Sensor Systems, Wright State University, Retrieved from Wayback Machine with date Oct. 30, 2005 from https://web.archive.org/web/2005090100000*/http://research.cs.tamu.edu/prism/lectures/iss/iss_19.pdf, 19 pages.

Harms, H. et al., "Comparison of digital focus criteria for a TV microscope system", Cytometry, vol. 5., No. 3, May 1, 1984, pp. 236-243.

Prescott, D. M. "Methods in Cell Biology", Academic Press: New York, 1976, vol. XIII, pp. 55-56.

Shapiro, L. et al. "Computer Vision: Chapter 4", Mar. 2000, p. 107-144.

Office Action of Japanese Patent Application No. 2012-548239, mailed on Nov. 18, 2014, 3 pages total.

* cited by examiner

PLANE OF BEST FOCUS

FIG. 8A

LATER IMAGE

FIG. 8B

PLANE OF BEST FOCUS

FIG. 8C

LATER IMAGE

FIG. 8D

PLANE OF BEST FOCUS

FIG. 8E

LATER IMAGE

FIG. 8F

CELL CHARACTERIZATION USING MULTIPLE FOCUS PLANES

This application claims priority to U.S. Provisional Patent Application No. 61/294,416 filed Jan. 12, 2010 and titled "Cell Characterization Using Multiple Focus Planes", the entire disclosure of which is hereby incorporated by reference herein for all purposes.

BACKGROUND OF THE INVENTION

Cytometry is a technical specialty concerned with the counting and characterization of biological cells. Often, the cells of interest are suspended in a fluid. Because a large number of cells may be present in a sample to be analyzed, automated counting and characterization techniques are desirable.

Some systems for performing cytometry use a camera or other arrangement of imaging components to make a digital image of a sample, and then use a computer to analyze the digital image to identify, count, and characterize cells appearing in the digital image. One system for performing image-based cytometry is described in co-pending provisional U.S. patent application Ser. No. 61/238,534, filed Aug. 31, 2009 and titled "Automated Cell Counter with Small Footprint and Limited Height", the entire disclosure of which is hereby incorporated by reference herein for all purposes.

One form of cell characterization is the identification of live and dead cells in a sample. Techniques for improving the accuracy of determining whether particular cells are live or dead are highly desirable.

BRIEF SUMMARY OF THE INVENTION

According to one aspect, a method of characterizing cells comprises forming, using a camera, a series of digital images of a sample containing the cells. Each digital image is taken at a different focus plane in relation to the sample. The method further comprises automatically identifying, using a specially programmed computer, a cell in at least two of the digital images, and automatically analyzing, using the specially programmed computer, the two digital images to classify a cell in the sample as either live or dead. In some embodiments, the method further includes automatically identifying, using the specially programmed computer, which of the digital images was taken at a plane of best focus. The method may further include automatically counting, using the specially programmed computer, the cells in the digital image identified as having been taken at the plane of best focus. In some embodiments, identifying which of the digital images was taken at a plane of best focus comprises evaluating a contrast metric for each of the digital images. In some embodiments, analyzing the two digital images to classify a cell in the sample as either live of dead further comprises recognizing that, based on an analysis of a first of the two digital images, the cell cannot be classified as live, locating the cell in the second digital image, and classifying the cell as live based on an analysis of a second of the two digital images. Locating the cell in the second digital image may comprise generating a score for an object in the second digital image, the score indicating a likelihood that the object is the cell. The score may include a component relating to the size of the object. The score may include a component relating to the location of the object. The score may include a component relating to the drift of objects between the taking of the first and second digital images. In some embodiments, locating the cell in the second digital image comprises generating a respective score for each object found in a region of the second one of the digital images corresponding to a region containing the cell in first digital image, each score indicating a likelihood that the respective object is the cell, and selecting as the cell the object having the highest score. In some embodiments, analyzing the two digital images to classify a cell in the sample as either live or dead further comprises recognizing that, based on an analysis the first digital image, the cell cannot be classified as live, successively analyzing images taken at other focus locations until either analysis of one of the images indicates that the cell is live or a predetermined maximum number of images to be analyzed has been reached, and when the cell has been identified as live, classifying the cell as live, and, when the predetermined maximum number of images to be analyzed has been reached without a determination that the cell is live, classifying the cell as dead.

According to another aspect, a system for characterizing cells comprises an electronic image sensor, an optical system that forms on the electronic image sensor an image of a sample containing the cells, a mechanism for adjusting the focus location of the optical system, and a computer coupled to the electronic image sensor. The computer controls the system to form a series of digital images of the sample, each digital image taken at a different focus plane within the sample, automatically identify a cell in at least two of the digital images, and automatically analyze the two digital images to classify a cell in the sample as either live or dead. In some embodiments, the computer further controls the system to identify which of the digital images was taken at a plane of best focus. In some embodiments, the computer further controls the system to count the cells appearing in the digital image identified as having been taken at the plane of best focus. The computer may compute a contrast metric to identify which of the digital images was taken at the plane of best focus. In some embodiments, the computer further controls the system to recognize that, based on an analysis of a first of the two digital images, the cell cannot be classified as live, locate the cell in the second digital image, and classify the cell as live based on an analysis of a second of the two digital images. In some embodiments, the computer further controls the system to generate a score for an object in the second digital image, the score indicating a likelihood that the object is the cell, and locate the cell in the second digital image based at least in part on the score. The score may include a component relating to the size of the object. The score may include a component relating to the location of the object. The score may include a component relating to the drift of objects between the taking of the first and second digital images. In some embodiments, the computer further controls the system to generate a respective score for each object found in a region of the second one of the digital images corresponding to a region containing the cell in first digital image, each score indicating a likelihood that the respective object is the cell, and select as the cell the object having the highest score. In some embodiments, the computer further controls the system to recognize that, based on an analysis of the first digital image, the cell cannot be classified as live, successively analyze images taken at other focus locations until either analysis of one of the images indicates that the cell is live or a predetermined maximum number of images to be analyzed has been reached, and when the cell has been identified as live, classify the cell as live, and, when the predetermined maximum number of images to be analyzed has been reached without a determination that the cell is live, classify the cell as dead.

DETAILED DESCRIPTION OF THE INVENTION

Figure 1:
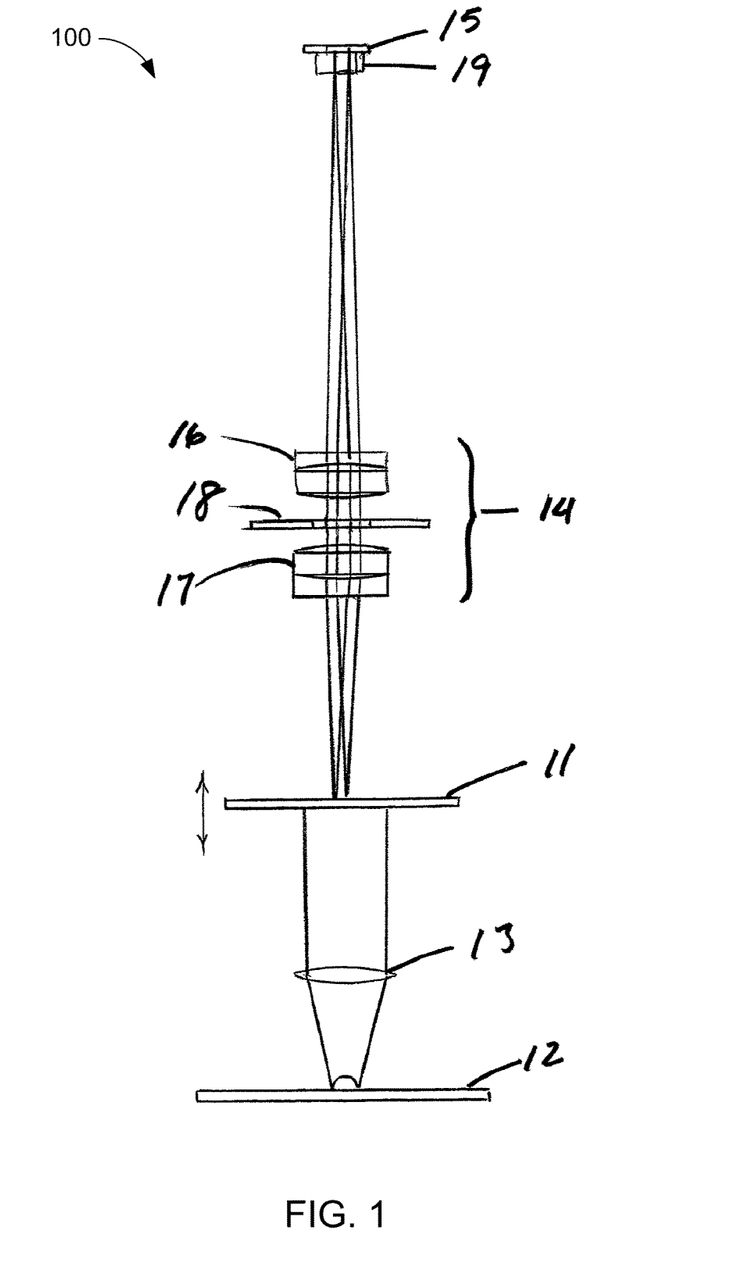
FIG. 1 is a schematic illustration of an example imaging cytometry system.

FIG. 1 is a schematic illustration of an example imaging cytometry system 100. In system 100, a sample slide 11 carries a sample of fluid in which cells are suspended. Preferably, the sample is constrained between transparent plates so that the cells are within a narrow range of vertical positions in the system. For example, the sample may be constrained in a sample chamber having a depth of 0.100 millimeters, although other chamber depths may be used. An LED board 12 serves as a light source for illuminating the sample. A collimating lens 13 may be positioned between LED board 12 and sample slide 11 to improve the characteristics of the illumination reaching the sample. An optical system 14 is positioned between the sample and an electronic image sensor 15, to form an image of the sample on sensor 15. Optical system 14 may comprise, for example, two lenses 16 and 17, separated by a distance, with an aperture 18 between lenses 16 and 17. Many other optical systems are possible having different numbers of optical elements. A field flattening lens 19 may be positioned immediately below sensor 15.

Sensor 15 is preferably a complementary metal oxide semiconductor (CMOS) type image sensor having a large number of photosensitive sites called pixels. For example, sensor 15 may be a model OV5620 or OV5632 color imager available from OmniVision of Santa Clara, Calif., USA. Suitable sensors are available from other manufacturers, and other kinds of sensors may be used. Optical system 14 and sensor 15 thus form part of a camera for taking digital images of the sample.

Even though the sample is constrained to be in a narrow height range, system 100 includes an automatic focusing capability. For example, the height of sample slide 11 may be automatically adjustable to adjust the focus of the system.

Figure 2:
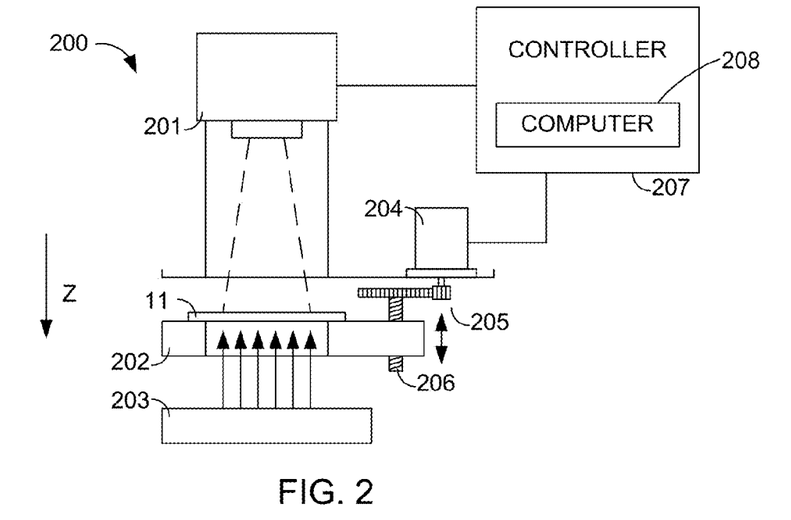
FIG. 2 illustrates another system for performing cell characterization, in accordance with embodiments of the invention.

FIG. 2 illustrates another system 200 for performing cell characterization, in accordance with embodiments of the invention. System 200 holds a sample slide 11, which in turn holds a sample containing cells to be characterized. A camera 201 is positioned to take digital images of the sample. For the purposes of this disclosure, a digital image is an ordered array of numerical values representing the brightness, color, or both of locations in the field of view of camera 201. Any digital file holding such an array is also considered to be a digital image, even if the file is compressed or encoded. For example, a digital image stored in the JPEG (Joint Photographic Experts Group) file format is considered to be a digital image. Elements of the array of digital values in a digital image may be called "pixels". For example, a pixel may comprise a single numerical value representing the brightness of a particular scene location in the camera's field of view, or a pixel may comprise a set of three or more numerical values indicating the brightness and color of the scene location, or other parameters. Camera 201 comprises an electronic image sensor, for example a CMOS sensor, a charge coupled device (CCD) sensor, or another kind of sensor that comprises an ordered array of photosensitive locations. These photosensitive locations are also often called "pixels", as they often correspond to the pixels in digital images taken by the camera. The meaning of the word pixel is generally clear from the context of its use.

In system 200, sample slide 11 rests on a slide stage 202, and is illuminated from its underside by a light source 203, which may be similar to LED board 12. System 200 is preferably nominally configured so that camera 201 focuses on the sample carried by sample slide 11. Additionally, system 200 includes a focus adjustment capability. In example system 200, sample stage 202 can be raised and lowered from its nominal position under control of stepper motor 204, through gear train 205 and lead screw 206. Many other schemes could be used for performing focus adjustment. For example, camera 201 could be moved in relation to slide stage 202, or a lens element or other component of camera 201 could be moved. Preferably, the range of motion provided by the system is selected to be compatible with the dimensions of the sample to be characterized. In one example embodiment, stepper motor 204 is microstepped and the mechanical components of the system are selected so that the nominal resolution with which slide stage 202 can be positioned is between about 2 and 5 micrometers, and the total travel of slide stage 202 exceeds about 200 micrometers.

The system is controlled by computerized controller 207, which includes computer 208. Controller 207 may also comprise power conversion and interface circuitry, input and output capabilities and any other necessary support hardware. Computer 208 may comprise a processor and memory, which can include volatile or nonvolatile memory such as RAM, ROM, EPROM, flash memory, magnetic disk storage, optical disk storage, tape storage, or any of these or other kinds of memory in any combination. The memory may hold instructions that specially program the computer to carry out steps of embodiments of the invention.

Figure 3:
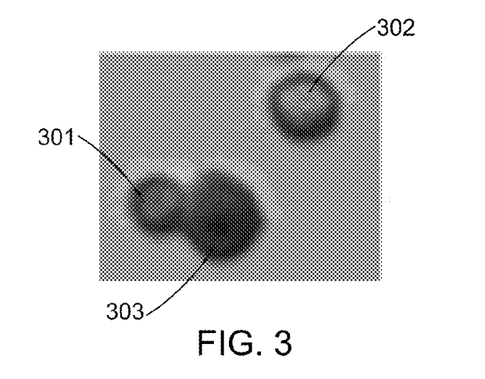
FIG. 3 shows a small portion of an example image showing three cells, in accordance with example embodiments of the invention.

Controller 207 interacts with camera 201 to take digital images of the sample and to analyze the resulting digital images. For example, FIG. 3 shows a small portion of an example image showing three cells 301, 302, and 303. It will be appreciated that FIG. 3 shows an area only a few pixels across, and that a complete digital image taken by camera 201 may be thousands of pixels across, and may encompass many more than the three cells shown in FIG. 3. A complete digital image may encompass thousands of cells, in some embodiments as many as 4000 cells. Typically, the cells themselves may be between about 8 and 50 microns in diameter, and the total area imaged by a complete digital image may be a few square millimeters. In one example embodiment, the area images is approximately 2×2 millimeters (about 4 mm$^2$), and the optics of camera 201 are configured so that this area is projected to approximately fill the sensor in camera 201. In one example embodiment, camera 201 has a sensor having 1944 rows of 2592 pixels each, and each sensor pixel corresponds to a field of view of roughly 1×1 micrometer at the sample. Other sensor sizes and resolutions may be used.

Figure 4:
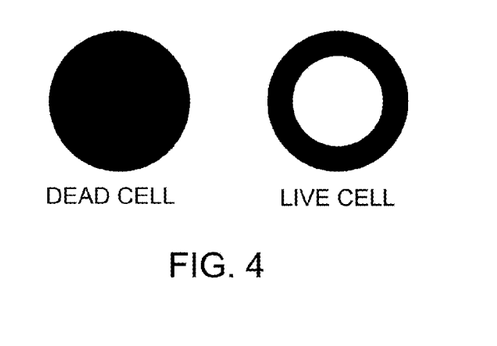
FIG. 4 shows an idealized comparison of a dead cell and a live cell after treatment with Tryphan blue dye, in accordance with embodiments of the invention.

In order to distinguish live cells from dead cells in a sample, the cells may be tagged in a way that live cells appear different from dead cells. For example, the sample may be treated with Tryphan blue dye. This dye is absorbed readily by dead cells, but live cell membranes tend to prevent absorption of the dye, so that live cells should appear to have lighter centers than dead cells. FIG. 4 shows an idealized comparison of a dead cell and a live cell after treatment with Tryphan blue dye.

Figure 5:
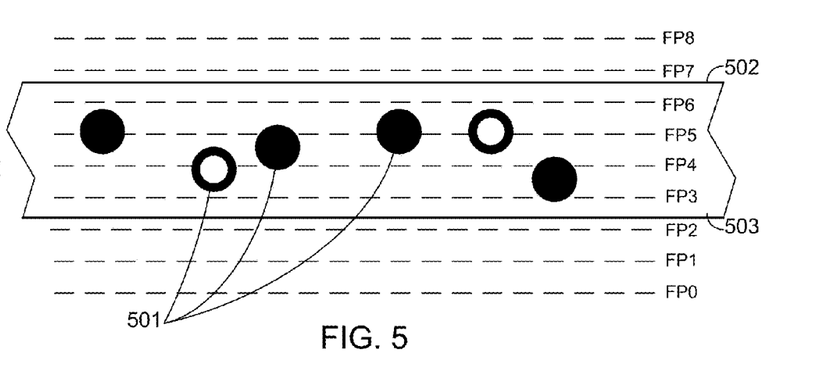
FIG. 5 shows a cross section of a sample, including the focus planes of 9 digital images taken by the system of FIG. 2, in accordance with embodiments of the invention.

As a first step in characterizing cells in accordance with embodiments of the invention, system 200 takes and stores a series of digital images at different focus locations. This series of digital images may be referred to as a "stack" of images. In system 200, sample stage 202 may be moved so that the sample is out of focus for camera 201 and a digital image taken, and then stage 202 moved so that the sample is more nearly in focus and another digital image taken, and so forth, moving the sample through and beyond the plane of best focus. In one example embodiment, 9 digital images are taken at focus locations about 28 micrometers apart, but it will be recognized that more or fewer images may be used, and that the focus locations used may be spaced differently than 28 micrometers. For the purposes of this disclosure, an image is "taken at" a particular focus location when the image is captured while the system is configured to focus at that focus location. Also, in this disclosure, the terms "focus plane" and "focus location" are used interchangeably, and it is to be understood that these terms encompass systems in which the focus location is not perfectly planar, for example due to image forming aberrations. In other embodiments, the camera may be moved or refocused to move the focus location with respect to the sample, rather than moving the sample with respect to the camera's best focus plane. FIG. 5 shows a cross section of a sample, including the focus planes of 9 digital images taken by the system, in accordance with embodiments of the invention. The focus planes are labeled FP0-FP8. Several cells 501 are also shown suspended between transparent members 502 and 503, which constrain the sample vertically.

For each of the 9 digital images, a contrast metric may be computed, either by computer 208 or other circuitry within the system. For example, if the sensor in camera 201 is a color sensor with pixels arranged in the well-know Bayer mosaic pattern, the contrast metric maybe the average of the differences in intensity recorded by adjacent green pixels. Generally, higher contrast in an image indicates better focus of the system used to take the image.

The digital image with the highest measured contrast is designated as having been taken at the plane of best focus. Work in relation to embodiments of the invention indicates that the most accurate counting of cells can be achieved using this digital image. Individual cells are identified in the digital image using known image processing techniques. For example, because the cells are relatively sparse in the sample, an intensity histogram of the digital image will tend to peak at an intensity value representing a background of the digital image. Cells, whether live or dead, will include pixels significantly darker than the background, so individual cells can be located by locating contiguous areas of dark pixels in the digital image. Live cells may also include pixels that are significantly lighter than the background level.

In accordance with embodiments of the invention, a cell counting process may include the following steps:

1) Determine the range and distribution of intensities, including localized trends. This is done to determine the ranges for thresholding the image and to correct intensity shifts through the image.

2) Threshold the image into dark, light and background pixels.

3) Form objects by tracking where dark and light pixels are touching.

4) Merge nearby objects (mostly objects contained with other objects, but isolated by background pixels. i.e. light centers of objects can be surrounded by dark pixels, but are disconnected by pixels classified as background).

5) Clean up objects. Collect buried background pixels, eliminate light pixels from outer edge, smooth edges and add border markings (used for circle fitting).

Once a list of objects is built, various filtering techniques may be applied to eliminate false cell identifications. For example, a contiguous dark area having a size or shape unlike that expected for a cell may be eliminated from consideration as a cell. A list of identified cells and their locations is stored for use in later operations.

The identified cells may then be analyzed to determine if they can be classified as live or dead. For example, each cell may be analyzed to see if the ratio of the number of pixels significantly lighter than the background value to the number of pixels significantly darker than the background value exceeds a predetermined threshold. Work in relation to embodiments of the invention also indicates that the digital image taken at the plane of best focus is not necessarily best for determining whether cells are live or dead. While dead cells tend to appear as dead in all of the digital images in the stack of digital images, live cells may appear live in some digital images and may appear dead in others.

Figure 6:
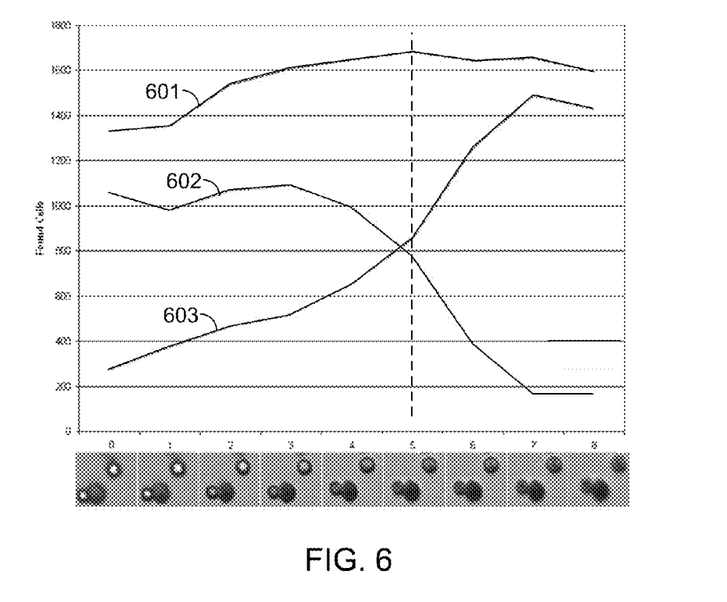
FIG. 6 illustrates the results of an example sample measurement.

FIG. 6 illustrates the results of an example measurement showing how images taken at different focus positions, if analyzed individually, give different results for total cell count and the number of cells identified as being live. In FIG. 6, curve 601 indicates the total number of cells automatically counted in each of 9 images taken at different focus positions. In this example, image 5 was designated as having been taken at the plane of best focus. As can be seen, the highest number of cells were identified in the image taken at best focus. Because cell counting errors tend to be errors of undercounting rather than overcounting, this indicates that using the best focus image for cell counting results in an accurate count.

Curve 602 indicates the number of cells that would be characterized as live in each of the images, if each image were analyzed in isolation. Likewise curve 603 shows the number of cells that would be characterized as dead if each image were analyzed in isolation. As can be seen, nearly all of the cells would be characterized as dead in image 8, which would be a significant undercounting of live cells. Even at the plane of best focus, the live cells are undercounted. Images 2-4 reveal many more live cells. As is explained above, errors in characterizing live cells also tend to be undercounting errors, so images 2-4 are shown to be more accurate for characterizing live cells. No single image is accurate for both total cell counting and live cell characterization. Furthermore, no single image is found to correctly reveal the live or dead status of the cells.

In accordance with embodiments of the invention, in order to improve the accuracy of classification of live and dead cells, other digital images in the stack of digital images are exploited to aid in the classification.

In a first step in the classification, each cell identified in the image taken at best focus is analyzed to see if it can be classified as live. If so, the cell is classified as live, and no further analysis need be done in relation to that cell. However, if the cell cannot be classified as live, further analysis is done using other digital images in the stack. The cell is located in another of the digital images, and analyzed again to see if it can be classified as live based on the second digital image. (Here "second" means the second image analyzed, which may not be the second image taken.) If so, the classification is made, and no further analysis is required in relation to that cell. If the cell still does not appear to be live, the cell may be located in yet another image in the stack, and the process repeated until either the cell is identified as a live cell, or a predetermined maximum number of images to analyze is reached. For example, the system may search only the image taken at the plane of best focus and at most the three images taken at the next locations farther from the camera. The system may search all of the images in the stack, but the cells in images taken at the extremes of focus travel may be so far out of focus that locating individual cells may become unreliable.

Figure 7:
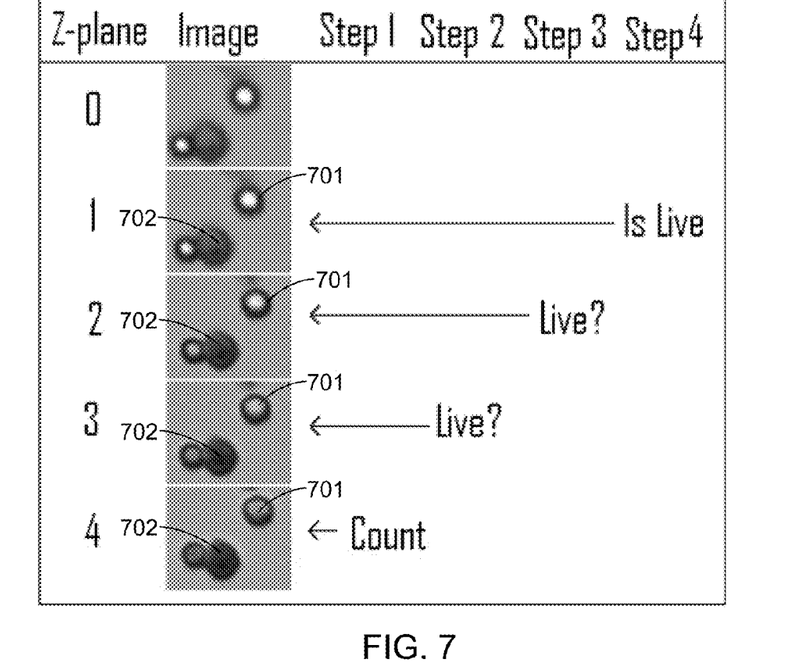
FIG. 7 illustrates a sequential analysis technique, in accordance with embodiments of the invention.

FIG. 7 illustrates this sequential analysis technique. In this example, the image taken at FP4 has been designated as having been taken at the plane of best focus, and the cells counted using that image. The three cells appearing in this section of the digital image all appear dead, including cell 701. Because cell 701 has not been classified as live after this first step, a second analysis is done, using the digital image taken at FP3. This second analysis still does not classify cell 701 as live, so the process continues until finally, the analysis of the image taken at FP1 indicates that cell 701 is indeed live. Although the image taken at FP0 is shown in FIG. 7, it need not be analyzed in relation to cell 701, because the status of cell 701 was finally determined by the analysis of the image taken at FP2. By contrast, cell 702 appears dead in all of the images, and will be classified as dead.

This process may be performed for all of the cells in the list of identified cells, and the system may report statistics based on the analysis. For example, the system may report the total number of cells identified, the total number of live cells identified, the total number of dead cells identified, the ratio of the number of live cells to the number of dead cells, the concentration of cells in the sample (for example measured in cells per microliter), the concentration of live cells in the sample, or any combination of these. One of skill in the art will recognize that other statistics may be reported as well.

It has also been observed that cells may move during the taking of the stack of digital images. Since the classification process described above depends for at least some cells on finding the same cell in multiple images in the stack, it is desirable to account for cell drift to improve the reliability of finding a particular cell in multiple images.

Figure 8A:
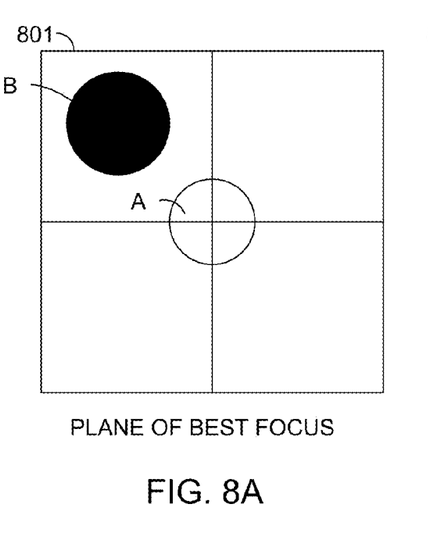
FIGS. 8A-8F illustrate a technique for accounting for cell drift, in accordance with embodiments of the invention.
Figure 8B:
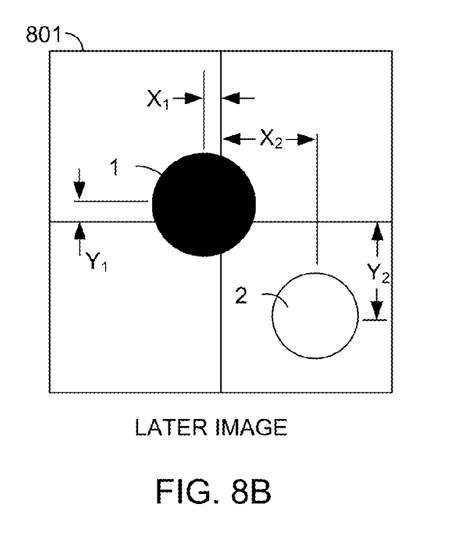

For example, FIG. 8A shows a portion 801 of a digital image taken at the plane of best focus, and including two cells A and B. The image portion may be referred to as a "region", and for the purposes of classification of cell A, is centered on the location of cell A in the image taken at best focus. The size of the region is selected to be large enough to accommodate drift of cells within the region, but small enough for computational efficiency. In one example embodiment, region 801 may be between 60 and 150 pixels on a side. FIG. 8B shows the same region extracted from a later image, in which objects 1 and 2 have been identified by the cell counting steps described above applied to the later image. Objects 1 and 2 are referred to as "objects" rather than cells because it is not known at this stage of the process which of them may be cell A. For example, in FIG. 8B, object 1 appears at nearly the same location as cell A appeared in FIG. 8A, so a less robust system may assume it is cell A and may reach an incorrect classification of cell A.

In accordance with embodiments of the invention, to account for cell drift, each object in the second image within the vicinity of the original location of cell A is evaluated and assigned a score that indicates a likelihood that the object is cell A. The score may have multiple components related to the size and position of the object, as well as the positions of other objects. A composite score based on these tests is generated for each object in the region, and the one with the highest score is taken to be the cell of interest (cell A in this example).

For example, the sizes both object 1 and object 2 may be compared with the size of cell A. In one example embodiment, each object is assigned a size score according to the formula size score=100−abs(cell$A$size−object size)/object size.

According to this example formula, an object the same size as cell A will receive a size score of 100, and objects larger or smaller than cell A will receive lower scores. Other formulas may be used that reflect the size comparison. Even if only a single object appears in the region in the second image, a very low size score could be used to decide that the object is not the cell of interest.

Objects 1 and 2 may also be scored on their proximity to the original location of cell A. In one example embodiment, each object is assigned a location score according to the formula location score=(100−abs(object$X$*100)/region width)+ 100−abs(object$Y$*100/region height).

According to this example formula, objects closer to the original position of cell A will be assigned higher location scores than objects farther from the original position of cell A. Other formulas may be developed as well.

Figure 8C:
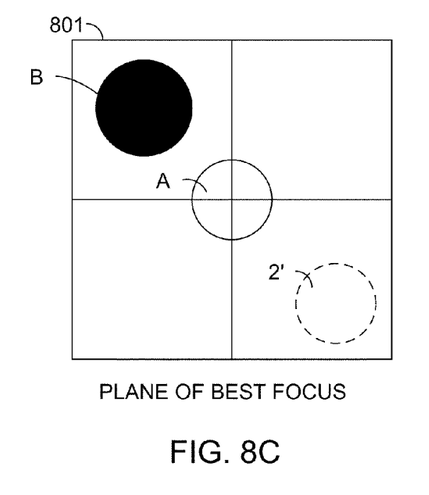
Figure 8D:
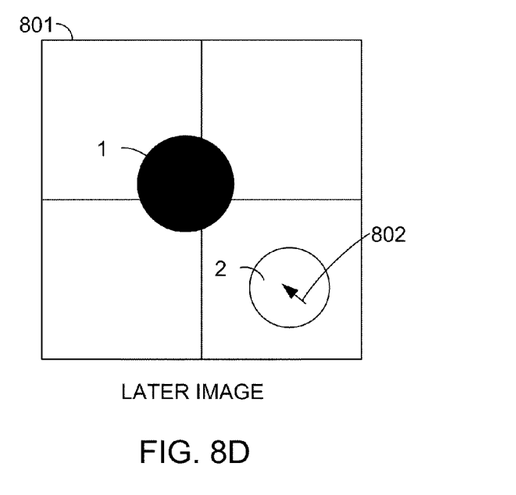

When more than one object is found in the region of the later image, an additional "neighbor drift" score component may be computed for each object based on it's the collective drift behavior of the other objects. For example, if object 1 is assumed (incorrectly) to be cell A, then it would have drifted slightly up and to the left between the taking of the two images of FIGS. 8A and 8B. Assuming other objects in the area would exhibit approximately the same drift behavior, then object 2 would also have drifted slightly up and to the left. This hypothesis is tested by looking for an object in the original image slightly down and to the right from the location of object 2 in the later image—in other words looking where object 2 would likely have come from if object 1 is cell A. This is illustrated in FIGS. 8C and 8D. Assuming object 2 drifted similarly to the hypothesized drift of object 1, illustrated by arrow 802, then we should expect to find object 2 in the best focus image in the location indicated by dashed circle 2'. Because no cell is found in the best focus image at location 2', the neighbor drift score of object 1 is very low or zero. The neighbor drift evaluation did not lend any support to the hypothesis that object 1 is cell A.

Figure 8E:
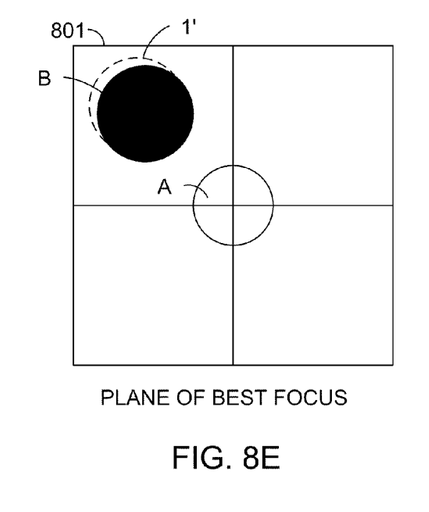
Figure 8F:
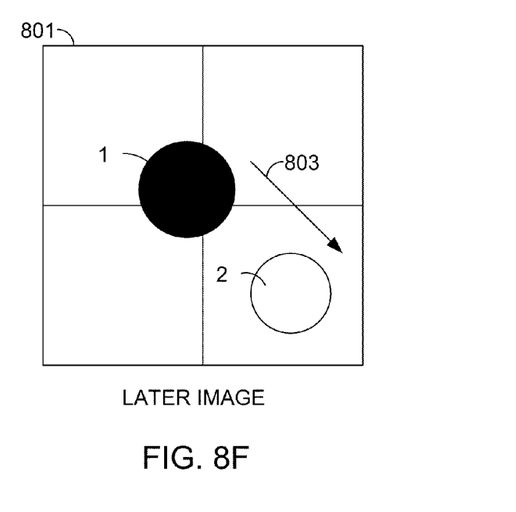

Next, object 2 is tested to see if it may be cell A, having drifted between the taking of the two images. As noted above, the size score for object 2 will be high, because it is the same size as cell A. In this example, the drift score for object 2 will also be high, and the composite score will conclusively indicate that object 2 is far more likely to be cell A than is object 1. The drift score for object 2 is evaluated as illustrated in FIGS. 8E and 8F. If object 2 is actually cell A, then it must have drifted significantly down and to the right between frames, as indicated by vector 803. And if other objects in the area behaved similarly, then object 1 must be an object that also drifted significantly down and to the right between frames. If that is true, then we should find an object similar to object 1 in the best focus image at a location above and to the left of the location of object 1 in the later image—where object 1 would likely have come from if object 2 is cell A. Reversing the direction of vector 803 and looking in the indicated location in the best focus image, indicated by circle 1', an object is indeed found very near the expected location. This indicates that the hypothesized drift of cell A is consistent with the apparent drift of other objects in the region, and lends further support for object 2 being cell A.

In one example embodiment, the drift score for object 2 is computed according to the formula $$\text{neighbor drift score} = (100 - \text{abs}(B\text{center}X - 1'\text{center}X)) + (100 - \text{abs}(B\text{center}Y - 1'\text{center}Y)).$$

Using this formula, finding an object in the best focus image in exactly the expected place results in a neighbor drift score of 200. Other formulas could be developed for the drift score. If more than two objects appear in the second image, a cumulative neighbor drift score may be computed that reflects the behavior of multiple neighbors. For example, if only two objects appear in the region, as in the above example, then the maximum possible cumulative score according to the example formulas for the three score components would be 500 points. But if three objects appear in the region, the maximum possible cumulative score may be 700 points—100 from the size test, 200 from the location test, and 200 from each of the neighbor objects in the neighbor drift test. When large numbers of objects appear in the region, the cumulative neighbor drift score component of the composite score may dominate the other components. Alternatively, the neighbor drift scores could be averaged to compute an average neighbor drift score. Many other weightings and combinations of score components are possible, and it is envisioned that other scoring techniques may be used.

In this example, object 2 will have a higher composite score than object 1, and object 2 will be taken to be cell A. If more objects are found in the region, they would also be similarly scored, and the object with the highest score taken to be the cell of interest.

Once cell A is identified in the later image, it can be analyzed to see if it can be characterized as live or dead. If it is not determined to be live, the process may be repeated on a still later image, using the image of FIGS. 8B, 8D, and 8F as the base image, and the location of object 2 (now identified as cell A) as the target location of cell A.

Embodiments of the invention as described above exploit the multiple available images in a computationally efficient way to arrive at an accurate total cell count and an accurate characterization of the cells as live or dead. Only as many images as are needed are analyzed to characterize a particular cell. The methods also enable the use of low-cost, relatively low resolution imaging optics and sensors to perform accurate cell counting and characterization. Because multiple images are used taken at different focus settings, the system is also tolerant of tilt of the sample, field curvature, or other effects tending to cause nonuniformity of focus across the sample.

In the claims appended hereto, the term "a" or "an" is intended to mean "one or more." The term "comprise" and variations thereof such as "comprises" and "comprising," when preceding the recitation of a step or an element, are intended to mean that the addition of further steps or elements is optional and not excluded. The invention has now been described in detail for the purposes of clarity and understanding. However, those skilled in the art will appreciate that certain changes and modifications may be practiced within the scope of the appended claims.

What is claimed is:

1. A method of characterizing cells, the method comprising:
   forming, using a camera, a series of digital images of a sample containing the cells, each digital image taken at a different focus plane in relation to the sample;
   automatically identifying, using a specially programmed computer, a cell in at least two of the digital images; and
   automatically analyzing, using the specially programmed computer, the two digital images to classify the identified cell in the sample as either live or dead;
   wherein analyzing the two digital images to classify a cell in the sample as either live of dead further comprises recognizing that, based on an analysis of a first of the two digital images, the cell cannot be classified as live; locating the cell in the second digital image; and classifying the cell as live based on an analysis of a second of the two digital images;
   and wherein locating the cell in the second digital image comprises generating a respective score for each object found in a region of the second one of the two digital images corresponding to a region containing the cell in first digital image, each score indicating a likelihood that the respective object is the cell; and selecting as the cell the object having the highest score.

2. The method of claim 1, further comprising automatically identifying, using the specially programmed computer, which of the digital images was taken at a plane of best focus.

3. The method of claim 2, further comprising automatically counting, using the specially programmed computer, the cells in the digital image identified as having been taken at the plane of best focus.

4. The method of claim 2, wherein identifying which of the digital images was taken at a plane of best focus comprises evaluating a contrast metric for each of the digital images.

5. The method of claim 1, wherein each score includes a component relating to the size of the respective object.

6. The method of claim 1, wherein each score includes a component relating to the location of the respective object.

7. The method of claim 1, wherein each score includes a component relating to the drift of objects between the taking of the first and second digital images.

8. A method of characterizing cells, the method comprising:
   forming, using a camera, a series of digital images of a sample containing the cells, each digital image taken at a different focus plane in relation to the sample;
   automatically identifying, using a specially programmed computer, a cell in a first one of the digital images;
   recognizing that, based on an analysis of the first digital image, the cell cannot be classified as live;
   successively analyzing images taken at other focus locations until either analysis of one of the images indicates that the cell is live or a predetermined maximum number of images to be analyzed has been reached; and
   when the cell has been identified as live, classifying the cell as live, and, when the predetermined maximum number of images to be analyzed has been reached without a determination that the cell is live, classifying the cell as dead.

9. A system for characterizing cells, the system comprising:
   an electronic image sensor;
   an optical system that forms on the electronic image sensor an image of a sample containing the cells;
   a mechanism for adjusting the focus location of the optical system; and
   a computer coupled to the electronic image sensor;
   wherein the computer controls the system to:
   form a series of digital images of the sample, each digital image taken at a different focus plane within the sample;
   automatically identify a cell in a first of at least two of the digital images;
   recognize that, based on an analysis of the first of the two digital images, the cell cannot be classified as live;

generate a respective score for each object found in a region of the second of the two digital images corresponding to a region containing the cell in the first one of the two digital images, each score indicating a likelihood that the respective object is the cell;

locate the cell in the second of the two digital images as the object having the highest score; and classify the cell as live based on an analysis of the second of the two digital images.

10. The system of claim 9, wherein the computer further controls the system to identify which of the digital images was taken at a plane of best focus.

11. The system of claim 10, wherein the computer further controls the system to count the cells appearing in the digital image identified as having been taken at the plane of best focus.

12. The system of claim 10, wherein the computer computes a contrast metric to identify which of the digital images was taken at the plane of best focus.

13. The system of claim 9, wherein each score includes a component relating to the size of the respective object.

14. The system of claim 9, wherein each score includes a component relating to the location of the respective object.

15. The system of claim 9, wherein each score includes a component relating to the drift of objects between the taking of the first and second digital images.

16. A system for characterizing cells, the system comprising:

an electronic image sensor;

an optical system that forms on the electronic image sensor an image of a sample containing the cells;

a mechanism for adjusting the focus location of the optical system; and a computer coupled to the electronic image sensor;

wherein the computer controls the system to:

form a series of digital images of the sample, each digital image taken at a different focus plane within the sample;

automatically identify a cell in a first of the series of digital images;

recognize that, based on an analysis of the first of the series of digital images, the cell cannot be classified as live;

successively analyze images taken at other focus locations until either analysis of one of the images indicates that the cell is live or a predetermined maximum number of images to be analyzed has been reached; and when the cell has been identified as live, classify the cell as live, and, when the predetermined maximum number of images to be analyzed has been reached without a determination that the cell is live, classify the cell as dead.

\* \* \* \* \*